(12) United States Patent
Tyagi et al.

(10) Patent No.: US 9,799,325 B1
(45) Date of Patent: Oct. 24, 2017

(54) METHODS AND SYSTEMS FOR IDENTIFYING KEYWORDS IN SPEECH SIGNAL

(71) Applicant: XEROX CORPORATION, Norwalk, CT (US)

(72) Inventors: Vivek Tyagi, New Delhi (IN); Prathosh Aragulla Prasad, Mysore (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/098,343

(22) Filed: Apr. 14, 2016

(51) Int. Cl.
*G10L 15/28* (2013.01)
*G10L 15/01* (2013.01)
*G10L 15/14* (2006.01)
*G10L 15/02* (2006.01)
*G10L 15/08* (2006.01)

(52) U.S. Cl.
CPC .............. *G10L 15/01* (2013.01); *G10L 15/14* (2013.01); *G10L 2015/022* (2013.01); *G10L 2015/088* (2013.01)

(58) Field of Classification Search
CPC ... G10L 2015/088; G10L 15/10; G10L 15/16; G10L 15/187; G10L 21/10
USPC ............ 704/231, 255, 235, 257, 256, 256.1, 704/256.6, 254, E15.005, E15.028
See application file for complete search history.

(56) References Cited

U.S. PATENT DOCUMENTS

| 5,400,434 | A | 3/1995 | Pearson |
| 6,275,806 | B1 | 8/2001 | Pertrushin |
| 7,003,120 | B1 | 2/2006 | Smith et al. |
| 7,627,475 | B2 | 12/2009 | Petrushin |
| 8,965,770 | B2 | 2/2015 | Petrushin |
| 2017/0133038 | A1* | 5/2017 | Jiang ........................ G10L 21/10 |

FOREIGN PATENT DOCUMENTS

CN 103258532 8/2013

OTHER PUBLICATIONS

John Makhoul. Linear prediction: A tutorial review. Proceedings of the IEEE, 63(4):561-580, 1975.
A. P. Prathosh, T. V. Ananthapadmanabha, and A. G. Ramakrishnan. Epoch extraction based on integrated linear prediction residual using plosion index. IEEE Trans. on Audio, Speech, and Lang. Process., 21, no-12:2471-2480, Dec. 2013.

(Continued)

*Primary Examiner* — Charlotte M Baker

(57) ABSTRACT

The disclosed embodiments relate to a method of keyword recognition in a speech signal. The method includes determining a first likelihood score and a second likelihood score of one or more features of a frame of said speech signal being associated with one or more states in a first model and one or more states in a second model, respectively. The one or more states in the first model corresponds to one or more tied triphone states and the one or more states in the second model corresponds to one or more monophone states of a keyword to be recognized in the speech signal. The method further includes determining a third likelihood score based on the first likelihood score and the second likelihood score. The first likelihood score and the third likelihood score are utilizable to determine presence of the keyword in the speech signal.

15 Claims, 4 Drawing Sheets

(56) References Cited

OTHER PUBLICATIONS

N. Fragopanagos, Roddy Cowie, Ellen Douglas-Cowie, Nicolas Tsapatsoulis, George Votsis, Stefanos Kollias, Winfried Fellenz, and John G Taylor. Emotion recognition in human-computer interaction. Signal Processing Magazine, IEEE, 18(1):32-80, 2001.
David Talkin. A robust algorithm for pitch tracking (rapt). Speech coding and synthesis, 495:518, 1995.

* cited by examiner

METHODS AND SYSTEMS FOR IDENTIFYING KEYWORDS IN SPEECH SIGNAL

TECHNICAL FIELD

The presently disclosed embodiments are related, in general, to speech signal analysis. More particularly, the presently disclosed embodiments are related to methods and systems for identifying keywords in a speech signal.

BACKGROUND

Speech signal may correspond to a voice signal that may include pronunciation of a sequence of words. With advent of speech signal processing, various automatic speech recognition (ASR) techniques, such as a large-vocabulary continuous speech recognition (LVCSR), which uses a triphone acoustic model, have been developed that may enable the extraction of keywords from the speech signal. The extracted keywords may be utilized in various application areas such as, but are not limited to, speech to text conversion (STT), determination of sentiments of a person, speech analytics, and/or the like.

Usually, the ASR techniques such as the LVCSR require a language model of bi-grams and tri-grams of a set of words. The speech signal (to be analyzed) is searched through the dictionary for identification of the keywords. As the speech signal is searched through the entire dictionary, the identification of the keywords in the speech signal may be computationally expensive. Therefore, the identification of the keywords from the speech signal in real time may not be feasible.

SUMMARY

The disclosed embodiments relate to a method of keyword recognition in a speech signal. The method includes determining, by one or more processors, a first likelihood score of one or more features of a frame of said speech signal being associated with one or more states in a first model, wherein the one or more states in the first model corresponds to one or more tied triphone states of a keyword to be recognized in the speech signal The method further includes determining, by said one or more processors, a second likelihood score of the one or more features of said frame of said speech signal being associated with one or more states in a second model, wherein the one or more states in the second model corresponds to one or more monophone states of the keyword to be recognized in the speech signal. The method further includes determining a third likelihood score based on the first likelihood score and the second likelihood score. The third likelihood score is deterministic of a likelihood of the frame corresponding to keywords other than the keyword. The first likelihood score and the third likelihood score are utilizable to determine whether the keyword is present in the speech signal.

The disclosed embodiments relate to a system of keyword recognition in a speech signal. The system includes one or more processors configured to determine a first likelihood score of one or more features of a frame of said speech signal being associated with one or more states in a first model, wherein the one or more states in the first model corresponds to one or more tied determine triphone states of a keyword to be recognized in the speech signal. The one or more processors are further configured to a second likelihood score of the one or more features of said frame of said speech signal being associated with one or more states in a second model, wherein the one or more states in the second model corresponds to one or more monophone states of the keyword to be recognized in the speech signal. The one or more processors are further configured to determine a third likelihood score based on the first likelihood score and the second likelihood score, wherein the third likelihood score is deterministic of a likelihood of the frame corresponding to keywords other than the keyword. The first likelihood score and the third likelihood score are utilizable to determine whether the keyword is present in the speech signal.

The disclosed embodiments relate to a computer program product for use with a computer. The computer program product comprising a non-transitory computer readable medium. The non-transitory computer readable medium stores a computer program code for keyword recognition in a speech signal. The computer program code is executable by one or more processors to determine a first likelihood score of one or more features of a frame of said speech signal being associated with one or more states in a first model, wherein the one or more states in the first model corresponds to one or more tied determine triphone states of a keyword to be recognized in the speech signal. The computer program code is further executable by the one or more processors to determine a second likelihood score of the one or more features of said frame of said speech signal being associated with one or more states in a second model, wherein the one or more states in the second model corresponds to one or more monophone states of the keyword to be recognized in the speech signal. The computer program code is further executable by the one or more processors to determine a third likelihood score based on the first likelihood score and the second likelihood score. The third likelihood score is deterministic of a likelihood of the frame corresponding to keywords other than the keyword. The first likelihood score and the third likelihood score are utilizable to determine whether the keyword is present in the speech signal.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
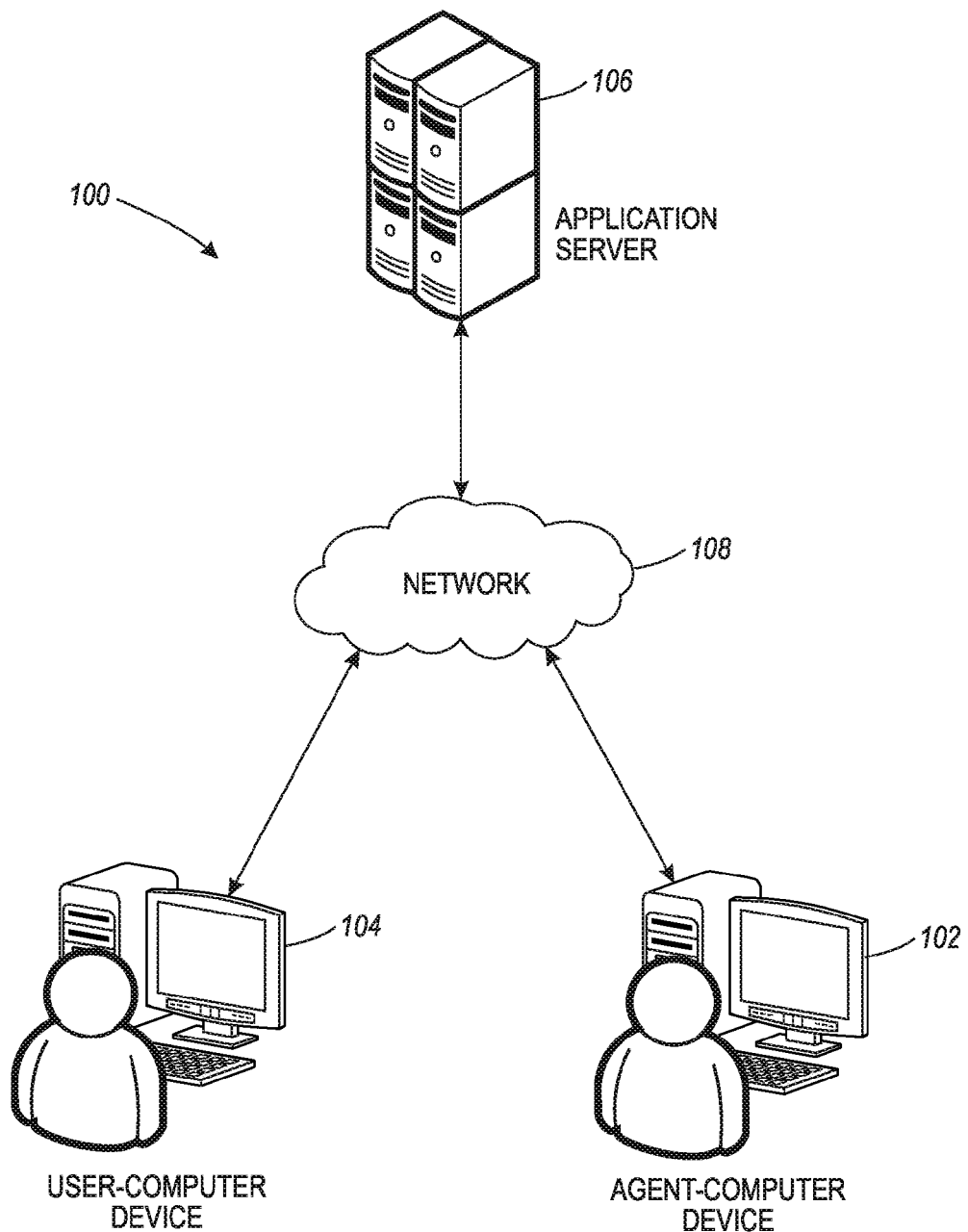
FIG. 1 is a block diagram illustrating a system environment in which various embodiments may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "speech signal" refers to a signal that represents a sound produced by a human subject. In an embodiment, the speech signal may represent a pronunciation of a sequence of words. In an embodiment, the pronunciation of the sequence of words may vary based on the background and dialect of the human subject. In an embodiment, the speech signal may have one or more associated features. In an embodiment, the one or more features associated with the speech signal may correspond to Mel-frequency cepstral coefficients (MFCC) vector. In an embodiment, the speech signal may be reproduced using one or more transducers such as a speaker, a headphone, a microphone, and/or the like.

A "frame of a speech signal" refers to a segment of the speech signal that is obtained based on sampling of the speech signal. In an embodiment, the speech signal may be sampled at a sampling frequency to generate one or more segments of the speech signal. In an embodiment, such segment of the speech signal may correspond to the frame of the speech signal. For example, if the time duration of the speech signal is 5 seconds and the sampling frequency of 1 KHz, 5000 frames of the speech signal will be generated after the process of sampling of the speech signal. In an embodiment, each of one or more frames may have one or more associated features. In an embodiment, the one or more associated features may correspond to the MFCC vector.

A "keyword" refers to a word in the speech signal that may be of importance to a user. In an embodiment, the user may provide a list of keywords that are to be recognized in the speech signal. In an embodiment, the keyword may correspond to a predetermined domain.

A "monophone" refers to an abstraction of a speech sound of a keyword in a speech signal. For example, if a keyword is "stop", corresponding monophones may include "s", "t", "oh", and "p". In an embodiment, the English language usually has 150 monophone states.

A "triphone of a keyword" refers to a sequence of three monophones of the keyword. For example, if a keyword is "stop", corresponding monophones may include "s", "t", "oh", and "p". Further, the triphones of the keyword "stop" may include "sil–s+t", "s–t+oh", "t–oh+p", and "oh–p+sil".

In an embodiment, the English language usually has 60,000 triphones.

A "tied-triphone" refers to a combination of two or more triphones that have same central monophone. In an embodiment, the English language may have 3000 tied triphones.

A "state" refers to a hidden state in the Markov Chain. In an embodiment, the state may have an associated emission probability. In an embodiment, the emission probability may correspond to a likelihood that a hidden state has generated the MFCC vector observed in a frame of the speech signal. Further, the state may be uni-directionally connected to other states in the Markov chain. In an embodiment, the state may have an associated transition probability that may correspond to a likelihood of the transition from the state to the connected state.

A "first model" refers to a Hidden Markov Model-Gaussian Mixture Model (HMM-GMM). In an embodiment, the first model may be generated based on one or more tied-triphone states of a keyword. In an embodiment, for each tied-triphone state, three state HMM model is trained. As the keyword may be represented by more than one tied-triphone state, therefore the three state HMM models, for each tied triphone state (representing the keyword), are connected to generate a super HMM model for the keyword.

A "second model" refers to a Hidden Markov Model-Gaussian Mixture Model (HMM-GMM). In an embodiment, the second model may be generated based on one or more monophone states of a keyword. In an embodiment, for each monophone state, three state HMM model is trained. As the keyword may be represented by more than one monophone state, therefore the three state HMM model, for each monophone state (representing the keyword), are connected to generate a super HMM model for the keyword.

A "third model" refers to a Hidden Markov Model-Gaussian Mixture Model (HMM-GMM). In an embodiment, the third model may comprise a single HMM state. In an embodiment, the third model is used for identifying keywords other than the one or more keywords. Further, the keywords other than the one or more keywords have been referred to as garbage keywords.

A "transition probability" refers to a likelihood of a transition from one state to another state in a state model such as a first model, a second model, or a third model.

A "first likelihood" refers to a probability that an HMM state in the first model has generated the one or more features associated with a frame of a speech signal. In an embodiment, the first likelihood is determined based on a first model.

A "second likelihood" refers to a probability that an HMM state in the second model has generated one or more features associated with a frame of a speech signal. In an embodiment, the second likelihood is determined based on a second model.

A "conversation" refers to one or more dialogues exchanged between a first person and a second person over a communication network. In accordance with an embodiment, the first person may correspond to an agent (in a customer care environment), and the second person may correspond to a customer. In accordance with an embodiment, the conversation may correspond to a verbal conversation between two users.

FIG. 1 is a block diagram of a system environment 100 where various embodiments of the disclosure may be implemented. The system environment 100 may comprise an agent-computing device 102, a user-computing device 104, an application server 106, and a network 108. The agent-computing device 102, the user-computing device 104, and the application server 106 are interconnected with each other over the network 108.

The agent-computing device 102 refers to a computing device that is used by an agent. In an embodiment, the agent may correspond to a worker or an employee that may assist a user to troubleshoot a problem being faced by the user. In an embodiment, the agent may further offer one or more products or services to the user. In an embodiment, the agent may receive a request for a conversation from the user-computing device 104 through the agent-computing device 102, or vice-versa. The agent may communicate with the user through the agent-computing device 102. In an embodiment, the conversation may correspond to an audio conversation or a video conversation.

In an embodiment, the agent-computing device 102 may include one or more processors, one or more filters, one or more transducers, and/or other components that are operable to execute one or more sets of instructions stored in one or more memories. The agent-computing device 102 may include a variety of computing devices, such as a laptop, a personal digital assistant (PDA), a tablet computer, a smartphone, a phablet, and/or the like.

The user-computing device 104 refers to a computing device that is associated with the user. The user may utilize the user-computing device 104 to initiate (or accept) the conversation with the agent associated with the agent-computing device 102. The user-computing device 104 may include one or more processors, one or more filters, one or more transducers, and/or other components that are operable to execute one or more sets of instructions stored in one or more memories of the user-computing device 104 to initiate, accept, and/or manage the conversation with the agent-computing device 102. In an embodiment, the user-computing device 104 may include a variety of computing devices, such as a laptop, a personal digital assistant (PDA), a tablet computer, a smartphone, a phablet, and/or the like.

The application server 106 may correspond to a computing device that is configured to recognize keywords in a speech signal corresponding to the conversation between the agent and the user. In an embodiment, the application server 106 may include one or more processors and one or more memories. The one or more memories store one or more sets of instructions, codes, programs, algorithms, and/or the like executable by the one or more processors to perform one or more predetermined operations associated with recognition/identification of keywords in the speech signal. In an embodiment, the application server 106 may receive an input pertaining to one or more keywords that are to be recognized in the speech signal. In an embodiment, the application server 106 may receive the input pertaining to the one or more keywords from an administrator. In an embodiment, the application server 106 may further receive the ongoing conversation between the user and the agent, from the agent-computing device 102 (or the user-computing device 104).

Further, the application server 106 may train a first model, a second model, and a third model based on the received one or more keywords. In an embodiment, the application server 106 may determine one or more monophones that are used in pronunciation of the one or more keywords. Based on the one or more monophones, the application server 106 may generate a second model. Concurrently, the application server 106 may determine one or more tied triphone states from the one or more monophones associated with the one or more keywords. Based on the one or more tied-triphone states, the application server 106 may train a first model.

Further, the application server 106 may train a third model for identification of the keywords other than the one or more keywords received for recognition.

In an embodiment, the received conversation may correspond to the speech signal. In an embodiment, the application server 106 may sample the speech signal to generate one or more frames. For each of the one or more frames, the application server 106 may determine a first likelihood, a second likelihood, and a third likelihood using the first model, the second model, and the third model, respectively. Based on the first likelihood and the third likelihood, the application server 106 may recognize the one or more keywords in the speech signal. The structure and the operation of the application server 106 have been described later in conjunction with FIG. 2. In an embodiment, the application server 106 may be realized through various types of application servers such as, but not limited to, a Java application server, a .NET framework, and a Base4 application server.

The network 108 corresponds to a medium through which content and messages may flow between one or more of, but are not limited to, the agent-computing device 102, the user-computing device 104, and/or the application server 106.

Examples of the network 108 may include, but are not limited to, a Wireless Fidelity (Wi-Fi) network, a Wide Area Network (WAN), a Local Area Network (LAN), or a Metropolitan Area Network (MAN). Various devices such as, the agent-computing device 102, the user-computing device 104, and/or the application server 106 may connect to the network 108 in accordance with various wired and wireless communication protocols such as the Transmission Control Protocol/Internet Protocol (TCP/IP), the User Datagram Protocol (UDP), and the 2G, 3G, or 4G communication protocols.

Figure 2:
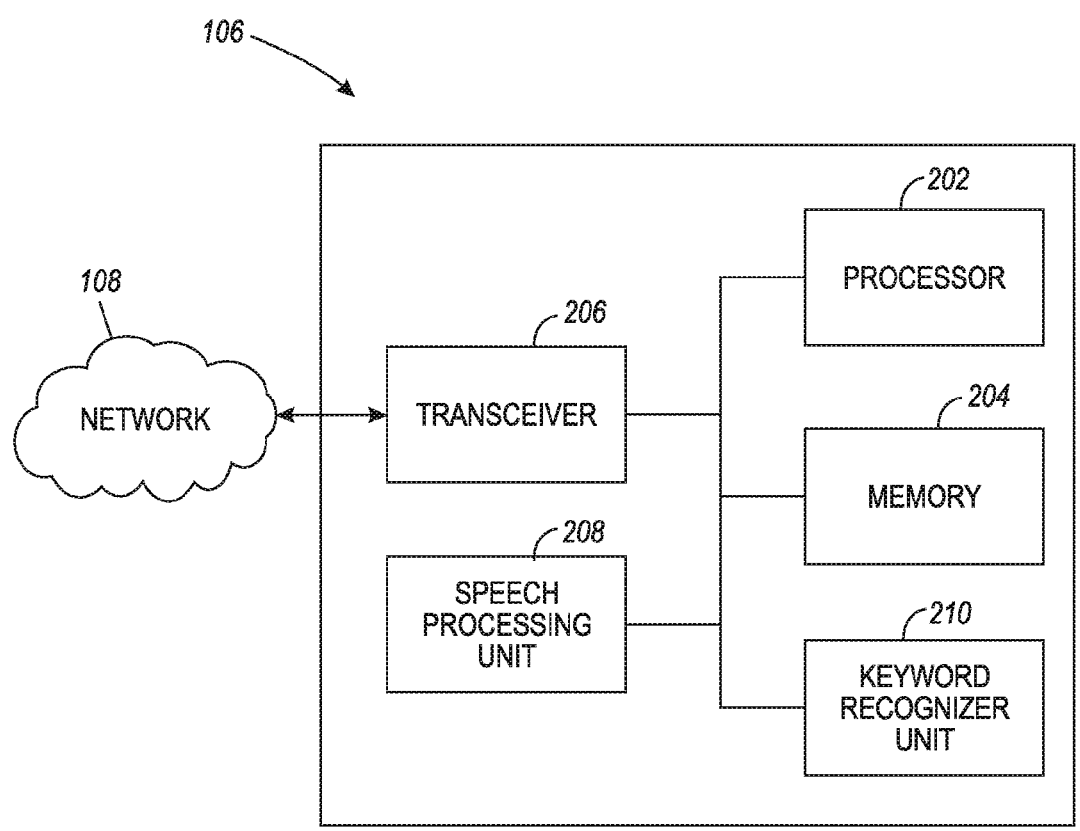
FIG. 2 is a block diagram of an application server, in accordance with at least one embodiment.

FIG. 2 is a block diagram of the application server 106, in accordance with an embodiment. The application server 106 comprises one or more processors, such as a processor 202, one or more memories, such as a memory 204, one or more transceivers, such as a transceiver 206, one or more speech processing units, such as a speech processing unit 208, and one or more keyword recognizer units, such as a keyword recognizer unit 210. The memory 204, the transceiver 206, the speech processing unit 208, and the keyword recognizer unit 210 are coupled to the processor 202. In an embodiment, the processor 202 may be configured to supervise the operation of the memory 204, the transceiver 206, the speech processing unit 208, and the keyword recognizer unit 210.

The processor 202 may comprise suitable logic, circuitry, and/or interfaces that may be configured to execute one or more sets of instructions stored in the memory 204 to perform the one or more predetermined operations on the application server 106. The processor 202 may be implemented using one or more processor technologies known in the art. Examples of the processor 202 include, but are not limited to, an X86 processor, a RISC processor, an ASIC processor, a CISC processor, or any other microprocessor.

The memory 204 may comprise suitable logic, circuitry, and/or interfaces that may be configured to store one or more machine codes, and/or computer programs having at least one code section executable by the processor 202. The memory 204 may store the one or more sets of instructions that are executable by the processor 202 to perform the one or more predetermined operations. It will be apparent to a person having ordinary skill in the art that the one or more sets of instructions stored in the memory 204 may enable the hardware of the application server 106 to perform the one or more predetermined operations. In an embodiment, the memory 204 may include one or more buffers (not shown). The one or more buffers may store at least a pronunciation dictionary of the one or more keywords. Some of the commonly known memory implementations include, but are not limited to, a random access memory (RAM), a read-only memory (ROM), a hard disk drive (HDD), and a secure digital (SD) card.

The transceiver 206 may comprise suitable logic, circuitry, and/or interfaces that may be operable to communicate with the one or more devices, such as the user-computing device 104 and/or the agent-computing device 102. The transceiver 206 may be operable to transmit or receive the instructions, queries, or other information to/from various components of the system environment 100. In an embodiment, the transceiver 206 may connect to the network 108 through an input/output terminal (not shown). In an embodiment, the input/output terminal may be realized through, but are not limited to, an antenna, an Ethernet port, a USB port or any other port that can be configured to receive or transmit data. The transceiver 206 may receive or transmit various data in accordance with various communication protocols such as, TCP/IP, UDP; and 2G, 3G, or 4G communication protocols through the input/output terminal, respectively.

The speech processing unit 208 may comprise suitable logic, circuitry, and/or interfaces that may be operable to process the speech signal. The speech signal may correspond to a signal that is representative of sound in the conversation between the agent and the user. In an embodiment, the speech processing unit 208 may be configured to sample the speech signal to generate one or more frames. In an embodiment, each of the one or more frames corresponds to a segment of the speech signal. A person having ordinary skills in the art will understand that the speech processing unit 208 may perform other speech processing operations such as, but are not limited to, filtering the speech signal for noise removal, Fourier transformation of the speech signal, A/D conversion of the speech signal, and/or the like. In an embodiment, the speech processing unit 208 may determine one or more features of each of the one or more frames based on the speech processing operations. In an embodiment, the one or more features may comprise, but are not limited to, a nasality of the audio, involvement of the lips in the audio, a portion of the tongue being used to generate the audio (i.e., tip of the tongue or body of the tongue). In an alternate embodiment, the one or more features may correspond to MFCC features. In an embodiment, the speech processing unit 208 may be implemented on an Application Specific Integrated Circuit (ASIC) or on a Field Programmable Gate Array (FPGA).

The keyword recognizer unit 210 may comprise suitable logic, circuitry, and/or interfaces that may be operable to recognize the one or more keywords in the speech signal (corresponding to the conversation). In an embodiment, the keyword recognizer unit 210 may be configured to train the first model for each of the one or more keywords. In an embodiment, the first model corresponds to a Hidden Markov Model-Gaussian Mixture Model (HMM-GMM). In an embodiment, the first model is trained based on the one or more tied triphone states of a keyword of the one or more keywords. In an embodiment, each of the one or more tied-triphone states is represented by a three state HMM model. As the keyword may be represented by more than one tied-triphone state, therefore, the three state HMM model, for each tied triphone state (representing the keyword), are connected to generate a super HMM model for the keyword. In an embodiment, the super HMM model corresponds to the first model. Therefore, the first model may include one or more states, where each of the one or more states have an associated emission probability. In an embodiment, the emission probability may correspond to the first likelihood. Further, the first model may define a transition probability among the one or more states of the keyword. In an embodiment, an example first model has been described later in conjunction with FIG. 3. In an embodiment, the keyword recognizer unit 210 may receive the one or more frames of the speech signal. For a frame of the one or more frames, the keyword recognizer unit 210 may utilize the first model to determine the first likelihood for the frame. In an embodiment, the first likelihood corresponds to a probability that the one or more features associated with the frame are generated based on a state in the first model. In an embodiment, the keyword recognizer unit 210 determines the first likelihood of the frame for each of the one or more keywords using respective first models. For example, if the one or more keywords comprise two keywords, the keyword recognizer unit 210 may comprise two first models for the two keywords. Further, the first likelihood is determined for each of the two keywords using respective first model. In an embodiment, the keyword recognizer unit 210 may further maintain a second model for each of the one or more keywords. In an embodiment, the second model may be trained based on one or more monophone states of the keyword from the one or more keywords. In an embodiment, each of the one or more monophone states is represented by the three state HMM models. As a keyword comprises multiple monophone states, the three state HMM models are connected to generate a super HMM model for the one or more monophone states associated with each of the one or more keywords. In an embodiment, the super HMM model created based on the one or more monophone states of the keywords corresponds to the second model. In an embodiment, the keyword recognizer unit 210 may determine the second likelihood for the frame using the second model. In the embodiment, the second likelihood corresponds to a likelihood that a state in the second model generates the one or more features associated with frame of the speech signal. In an embodiment, the keyword recognizer unit 210 may determine the second likelihood for each of the one or more keywords. In an embodiment, the keyword recognizer unit 210 may be implemented on an Application Specific Integrated Circuit (ASIC) or on a Field Programmable Gate Array (FPGA). In an embodiment, the structure of the keyword recognizer unit 210 has been described later in conjunction with FIG. 3.

In operation, the processor 202 may receive the ongoing conversation between the agent and the user from the agent computing device 102 or the user-computing device 104. In an embodiment, the processor 202 may receive the ongoing conversation in the form of the speech signal.

Prior to the reception of the ongoing conversation, the processor 202 may receive the one or more keywords that are to be recognized in the speech signal. After receiving the one or more keywords, the processor 202 may train the first model for each of the one or more keywords. In order to train the first model for each of the one or more keywords, the processor 202 may determine one or more monophone states for each of the one or more keywords. In an embodiment, the processor 202 may determine the one or more monophone states for each of the one or more keywords from the pronunciation dictionary in the memory 204. Thereafter, the processor 202 may determine one or more triphone states for each of the one or more keywords from the one or more monophone states by combining three monophone states sequentially. In an embodiment, the processor 202 may further determine the one or more tied-triphone states from the one or more triphone states using a technique, such as a decision tree clustering technique and/or the like. Further, the processor 202 may receive a training speech signal that corresponds to pronunciation of the one or more keywords.

Based on the training speech signal, the processor 202 may train the three state HMM models for each of the tied triphone state of the one or more one or more tied-triphone states associated with each of the one or more keywords. In an embodiment, the processor 202 may employ an Estimation Maximization (EM) model to train the three state HMM models. The processor 202 may then combine/connect three state HMM models created for each of the tied triphone states to create the super HMM model. In an embodiment, the super HMM model, created based on the one or more tied-triphone states of a keyword, corresponds to the first model. In an embodiment, the processor 202 may create the first model for each of the one or more keywords. As each tied triphone state is represented by the three states (HMM model), therefore, the first model comprises one or more states. In an embodiment, each of the one or more states may have an associated emission likelihood. In an embodiment, the emission likelihood corresponds to the first likelihood. Further, each state may have an associated transition likelihood.

In an embodiment, the processor 202 may be further configured to train the second model for each of the one or more keywords based on the one or more monophone states of each of the one or more keywords and the training speech signal. In an embodiment, the processor 202 may train the three state HMM model for each of the one or more monophones states associated with each of the one or more keywords. Thereafter, the processor 202 may combine/connect the three states HMM model trained for each of the one or more monophone states to train the second model. In an embodiment, each state in the second model may have an associated emission probability. In an embodiment, the emission probability associated with a state in the second model may correspond to the second likelihood. Further, during training of the second model, the transition probability between the two connected states is determined.

In an embodiment, the processor 202 may be further configured to train a third model. In an embodiment, the third model corresponds to a single state HMM model that is used to identify keywords other than the one or more keywords. In an embodiment, such keywords have been hereinafter referred to as garbage keywords.

In an embodiment, the processor 202 may compile the first model for each of the one or more keywords, the second model for each of the one or more keywords, and the third model as the keyword recognizer unit 210.

After training of the first model, the second model and the third model, the processor 202 may receive the ongoing conversation from the agent-computing device 102 or the user-computing device 104. The processor 202 may transmit the ongoing conversation to the speech processing unit 208. In an embodiment, the speech processing unit 208 may be configured to sample the speech signal (i.e., the conversation) in the one or more frames. In an embodiment, the speech processing unit 208 may sample the speech signal at a sampling frequency. A person having ordinary skill in the art will appreciate that the sampling frequency for a typical speech signal is in the range of "8 KHz" to "10 KHz". For example, the speech signal is of duration "5 seconds" and the sampling rate is "10 KHz". In such a case, the speech processing unit 208 may create 50000 frames.

Thereafter, for a frame of the one or more frames, the speech processing unit 208 may determine the one or more features. In an embodiment, the one or more features may comprise at least an amplitude of the audio in the frame, a frequency of the audio in the frame, a nasality of the audio in the frame, involvement of the lips in the audio in the frame, a portion of the tongue being used to generate the audio in the frame (i.e., tip of the tongue or body of the tongue). In an embodiment, the one or more features may correspond to the MFCC features. In an embodiment, the speech processing unit 208 may utilize one or more known techniques known in art such as, but are not limited to, discrete Cosine transform (DCT), and Fast Fourier Transform (FFT) to determine the one or more features.

The keyword recognizer unit 210 may be configured to receive the frame from the speech processing unit 208. Further, the keyword recognition unit 210 may further receive the one or more features associated with the frame from the speech processing unit 208. For the frame, the keyword recognition unit 210 may determine the first likelihood using the first model of each of the one or more keywords. In an embodiment, the keyword recognition unit 210 may utilize the following equation to determine the first likelihood:

$$p(y_1^T, \theta_1^T|\lambda) = \Pi_{t=1}^T P(\theta_T|\theta_{T-1}) \cdot p_\theta(y_t|\theta_t) \qquad (1)$$

where, $p(y_1^T, \theta_1^T|\lambda)$: probability that the one or more features of the frame has originated from state $\theta_1^T$ (i.e., the first likelihood);

$\lambda$: parameters of the first model;

$y_1^T$: the one or more features associated with the frame; and

T: total number of one or more frames.

A person having ordinary skills in the art will appreciate that the scope of the disclosure is not limited to determining the first likelihood for the keyword. In an embodiment, the first likelihood is determined for each of the one or more keywords using respective first models.

In an embodiment, the keyword recognition unit 210 may be further configured to determine the second likelihood for the frame. In an embodiment, the keyword recognition unit 210 may utilize the second model of the keyword to determine the second likelihood. As discussed, the second model is trained based on the one or more monophone states of the keyword. Therefore, the keyword recognition unit 210 may utilize the second model to determine the second likelihood of the frame corresponding to the one or more monophone states. In an embodiment, the keyword recognition unit 210 may utilize the equation 1 to determine the second likelihood. A person having ordinary skill in the art will understand that in the equation 1, the parameter of the second model may be used instead of the parameters of the first model to determine the second likelihood.

A person having ordinary skills in the art will appreciate that the scope of the disclosure is not limited to determining the second likelihood for the keyword. In an embodiment, the second likelihood is determined for each of the one or more keywords using respective second models.

After the determination of the first likelihood and the second likelihood, the keyword recognition unit 210 may be configured to determine maxima among the first likelihood and the second likelihood. Further, the keyword recognition unit 210 may be configured to determine minima among the first likelihood and the second likelihood. In an embodiment, the keyword recognition unit 210 may utilize the following equation to determine the maxima and the minima:

$$p_{max}^T = \text{Max}(p_j^{mono}(t), p_i^{tri}(t)) \quad (2)$$

$$p_{min}^T = \text{Min}(p_j^{mono}(t), p_i^{tri}(t)) \quad (3)$$

where, $p_{max}^T$: Maximum likelihood among the first likelihood and the second likelihood;

$p_{min}^T$: Minimum likelihood among the first likelihood and the second likelihood;

$p_i^{tri}(t)$: First likelihood; and $p_j^{mono}(t)$: Second likelihood.

After the determination of the maximum likelihood and the minimum likelihood, the keyword recognition unit 210 may determine the third likelihood based on the maximum likelihood and the minimum likelihood. In an embodiment, the keyword recognition unit 210 may utilize the following equation to determine the third likelihood:

$$p_{gbg}(t) = \alpha p_{max}(t) + (\alpha - 1) P_{min}(t) \quad (4)$$

where, $p_{gbg}(t)$: Third likelihood; and $\alpha$: a predefined constant.

Referring to equation 4, the predefined constant may be determined based on experimentations. In an embodiment, the predefined constant may correspond to a sensitivity of the keyword recognition unit 210. In an embodiment, the value of the predefined constant may govern the classification of the audio of the frame as the garbage keyword or as the one or more keywords. In an embodiment, the third likelihood corresponds to a probability that audio in the frame corresponds to keywords other than the one or more keywords. As discussed, such keywords have been referred to as the one or more garbage keywords.

In an embodiment, the keyword recognition unit 210 may be further configured to determine a first score for each of the one or more states in the first model for the keyword. In an embodiment, the keyword recognition unit 210 may utilize the following equation to determine the first score:

$$S_{i,k,t} = \max\{S_{parents\ of\ i,k,t-1}\} + p_i^{tri}(t) \quad (5)$$

where, $S_{i,k,t}$: Score of $i^{th}$ state for $t^{th}$ frame;

$S_{parents\ of\ i,k,t-1}$: Score of states from which the $i^{th}$ state can be derived; and k: Keyword under consideration.

Referring to equation 5, the score of the $i^{th}$ state of the one or more tied-triphone state is dependent on the scores assigned to parent states of the $i^{th}$ state in the previous iteration. In an embodiment, the previous iteration corresponds to determination of the first score for a second frame that chronologically preceded the frame.

For example, if the first model of the keyword comprise six states. Further, for instance, the $6^{th}$ state can be derived from the $1^{st}$ state and the $2^{nd}$ state. Then, the $1^{st}$ state and the $2^{nd}$ state may correspond to the parent states of the $6^{th}$ state. The first score determined for each of the six states for a first frame have been listed in the table below:

TABLE 1

First score of the one or more tied-triphone states based on the first frame.

| State | First Score |
|---|---|
| 1 | 1.2 |
| 2 | 4 |

TABLE 1-continued

First score of the one or more tied-triphone states based on the first frame.

| State | First Score |
|---|---|
| 3 | 2 |
| 4 | 2.4 |
| 5 | 0.78 |
| 6 | 0.75 |

For a second frame of the one or more frames, the keyword recognition unit 210 determines the first likelihood for each of the one or more states based on the equation 1. For instance, following table illustrates the first likelihood determined for the second frame:

TABLE 2

First likelihood for the one or more tied-triphone states.

| State | First Likelihood |
|---|---|
| 1 | 0.2 |
| 2 | 0.6 |
| 3 | 0.54 |
| 4 | 0.45 |
| 5 | 0.3 |
| 6 | 0.5 |

In an embodiment, if the second frame is chronologically subsequent to the first frame, the keyword recognition unit 210 may utilize the equation 5 to determine the first score for each of the one or more states. For example, the first score for the $6^{th}$ state may correspond to (max(1.2, 4)+0.5), which is 4.5.. A person having ordinary skills in the art will appreciate that the first score of the $1^{st}$ state and the $2^{nd}$ state have been considered because the $6^{th}$ state is a child tied-triphone state of the $1^{st}$ state and the $2^{nd}$ state.

In an embodiment, the keyword recognition unit 210 may determine a second score for each of the state in the third model. In an embodiment, the keyword recognition unit 210 may utilize the following equation to determine the second score:

$$S_{i,GBG,t} = \max\{S_{parents\ of\ i,GBG,t-1}\} + p_{gbg}(t) \quad (5)$$

where, $S_{i,k,t}$: Score of $i^{th}$ state for $t^{th}$ frame;

$S_{i,k,t-1}$: Score of $i^{th}$ state for $t-1^{th}$ frame; and gbg: Garbage keyword under consideration.

In an embodiment, the keyword recognition unit 210 may store the information pertaining to the connection between the one or more states in the first model. In an embodiment, the information pertaining to the connection of the one or more states may correspond to the transient probability among the one or more states (in the first model). In an embodiment, the transient probability of a state may correspond to a likelihood of transition to the state from one or more parent states. Similarly, the keyword recognition unit 210 may store the information pertaining to the connection between the one or more monophone states.

After, the determination of the first score and the second score for each of the one or more frames, the keyword recognition unit 210 performs a back trace operation in the first model for each of the one or more keywords, and the third model. In an embodiment, the back trace operation comprises selection of a state in the first model that has the maximum first score. Thereafter, based on the path information, and the count of the one or more frames, the keyword recognition unit 210 performs the back trace operation to determine whether the keywords are present in the speech signal.

A person having ordinary skills in the art will appreciate that during the back trace operation, the state with a higher first score is selected in each iteration. For example, out of the five states in the first model, third state is selected as the third state has the highest first score. In the subsequent iteration, the keyword recognizer unit 210 may select a state of the third state, which has the higher first score. In an embodiment, the keyword recognizer unit 210 may also determine a probability of the keyword being present in the speech signal based on the transition probability among the selected states.

A person having ordinary skills in the art will appreciate that the scope of the disclosure is not limited to recognizing the keyword in the speech signal. In an embodiment, the operation of the application server 106 may be extended for each of the one or more keywords and for each of the one or more frames of the speech signal.

Figure 3:
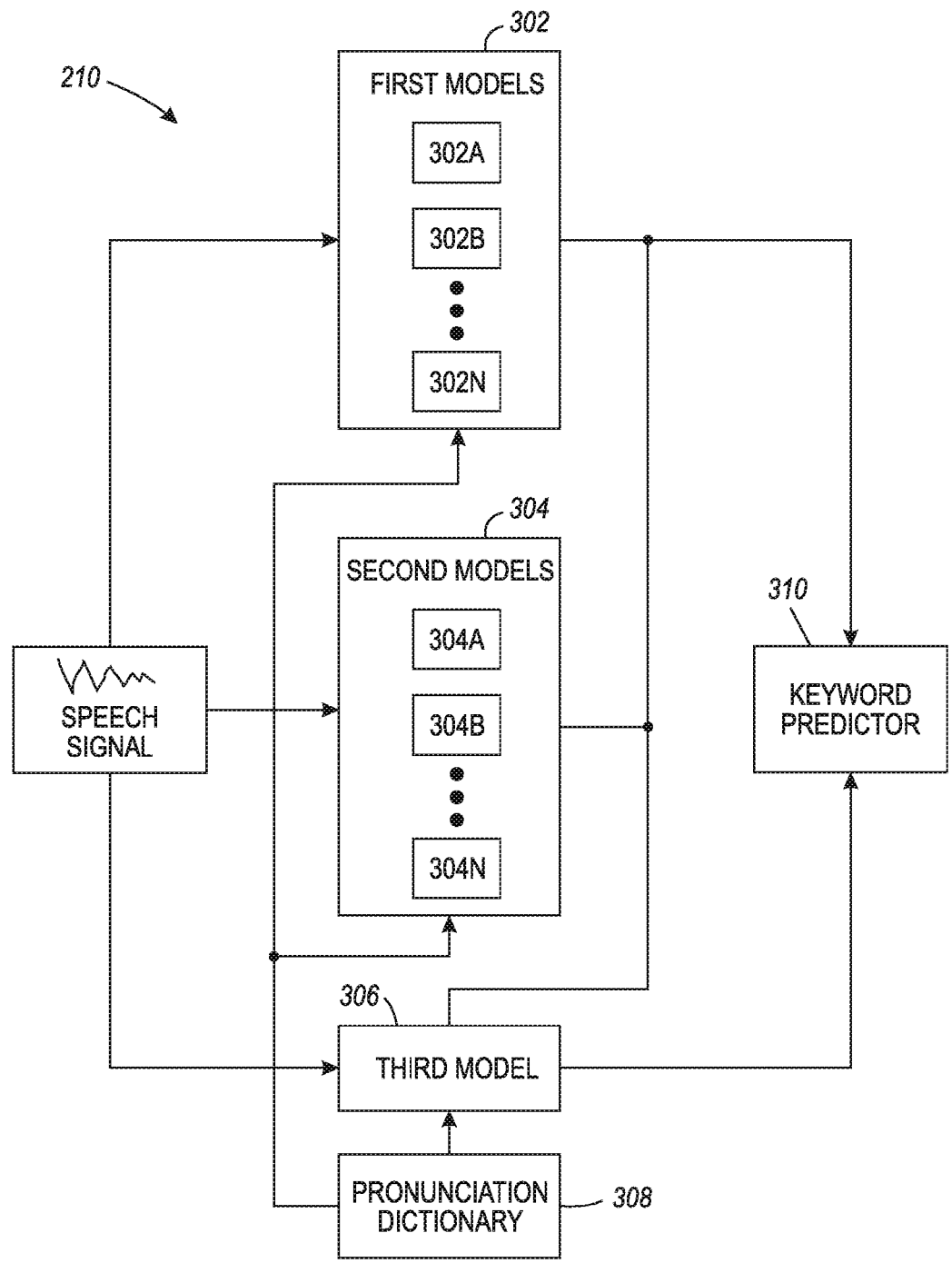
FIG. 3 is a block diagram of a keyword recognizer unit, in accordance with at least one embodiment.

FIG. 3 is a block diagram of the keyword recognizer unit 210, in accordance with at least one embodiment. The keyword recognizer unit 210 has been described in conjunction with FIG. 2.

The keyword recognizer unit 210 comprises the first model for each of the one or more keywords 302a, 302b, . . . , 302n, the second model for each of the one or more keywords 304a, 304b, . . . , 304n, the third model 306, the pronunciation dictionary 308, and the keyword predictor 310. Hereinafter, the first model for each of the one or more keywords 302a, 302b, . . . , 302n, the second model for each of the one or more keywords 304a, 304b, . . . , 304n, have been referred to as the first models 302, and the second models 304, respectively.

In an embodiment, the first models 302, the second models 304, and the third model 306 are connected in such a manner that each of the first models 302, each of the second models 304, and the third model 306 receive the one or more frames. The output of the first models 302 and the second models 304 are connected to the third model 306. Further, the output of the first models 302 and the third model 306 are connected to the keyword predictor 310. In an embodiment, each of the first models 302, the second models 304, and the third model 306 are further connected to the pronunciation dictionary 308.

The first models 302 may comprise suitable logic, circuitry, and/or interfaces that may be configured to determine whether the one or more keywords are present in the speech signal. In an embodiment, each of the first models 302 may comprise the one or more states for the respective keyword. For example, the first model 302a may comprise the one or more states for the keyword-1. Similarly, the first model 302b may comprise the one or more states for the keyword-2. In an embodiment, the first models 302 may further be configured to determine the probability of the presence of the one or more keywords in the speech signal. The first models 302 may transmit the probability to the keyword predictor 310. In an embodiment, each of the first models may further transmit the first likelihood, of each of the one or more frames corresponding to the respective one or more states, to the third model.

The second models 304 may comprise suitable logic, circuitry, and/or interfaces that may be configured to determine whether the one or more keywords are present in the speech signal. In an embodiment, each of the second models 304 may comprise the one or more states for the respective keyword. For example, the second model 304a may comprise the one or more states for the keyword-1. Similarly, the second model 304b may comprise the one or more states for the keyword-2. In an embodiment, each of the second models may further transmit the second likelihood, of each of the one or more frame corresponding to the respective one or more states, to the third model.

The third model 306 may comprise suitable logic, circuitry, and/or interfaces that may be configured to determine whether keywords other than the one or more keywords are present in the speech signal. In an embodiment, the third model 306 may comprise the state. In an embodiment, the third model 306 may receive the first likelihood and the second likelihood from the first models 302 and the second models 304, respectively. Further, the third model 306 may receive the one or more frames of the speech signal. In an embodiment, the third model 306 may utilize the first likelihood, the second likelihood, and the one or more features of the one or more frames to determine the third likelihood of each of the one or more frames corresponding to the one or more garbage states. In an embodiment, the third model 306 may generate the probability of presence of garbage keywords in the speech signal. In an embodiment, the third model may transmit the probability to the keyword predictor 310.

In operation, the keyword recognizer unit 210 may receive the one or more frames from the speech processing unit 208. In an embodiment, each of the one or more frames is transmitted to each of the first models 302, each of the second models 304, and the third model 306. For the frame of the one or more frames, the first models 302 and the second models 304 generate the first likelihood and the second likelihood, respectively. Each of the first models 302 and the second models 304 transmits the first likelihood and the second likelihood to the third model 306. In an embodiment, the third model 306 may determine the third likelihood for the frame based on the first likelihood and the second likelihood. Similarly, the first models 302, the second models 304, and the third model 306 may determine the first likelihood, the second likelihood, and the third likelihood for each of the one or more frames.

Based on the first likelihood, the second likelihood, and the third likelihood, each of the first models 302, the second models 304, and the third model 306 generate a measure of the probability of the presence of the one or more keywords in the one or more frames. The measure of the probability for each of the one or more keywords is transmitted to the keyword predictor 310. In an embodiment, the keyword predictor 310 may compare probability of each of the one or more keywords with a predetermined threshold. Based on the comparison, the keyword predictor 310 may predict which of the one or more keywords are present in the speech signal.

For example, following table illustrates the measure of probability for each of the one or more keywords.

TABLE 3

Example measure of probability for each of the one or more keywords.

| Keywords | Measure of probability |
|---|---|
| Keyword-1 | 0.8 |
| Keyword-2 | 0.64 |
| Keyword-3 | 0.5 |
| Garbage keyword | 0.9 |

For the purpose of the exemplary scenario, let the predetermined threshold be 0.7. The keyword predictor 310 may compare the predetermined threshold with each of the measure of the probability. Based on the comparison, the keyword predictor 310 may determine that the keyword-1 and the garbage keywords are present in the speech signal.

Figure 4:
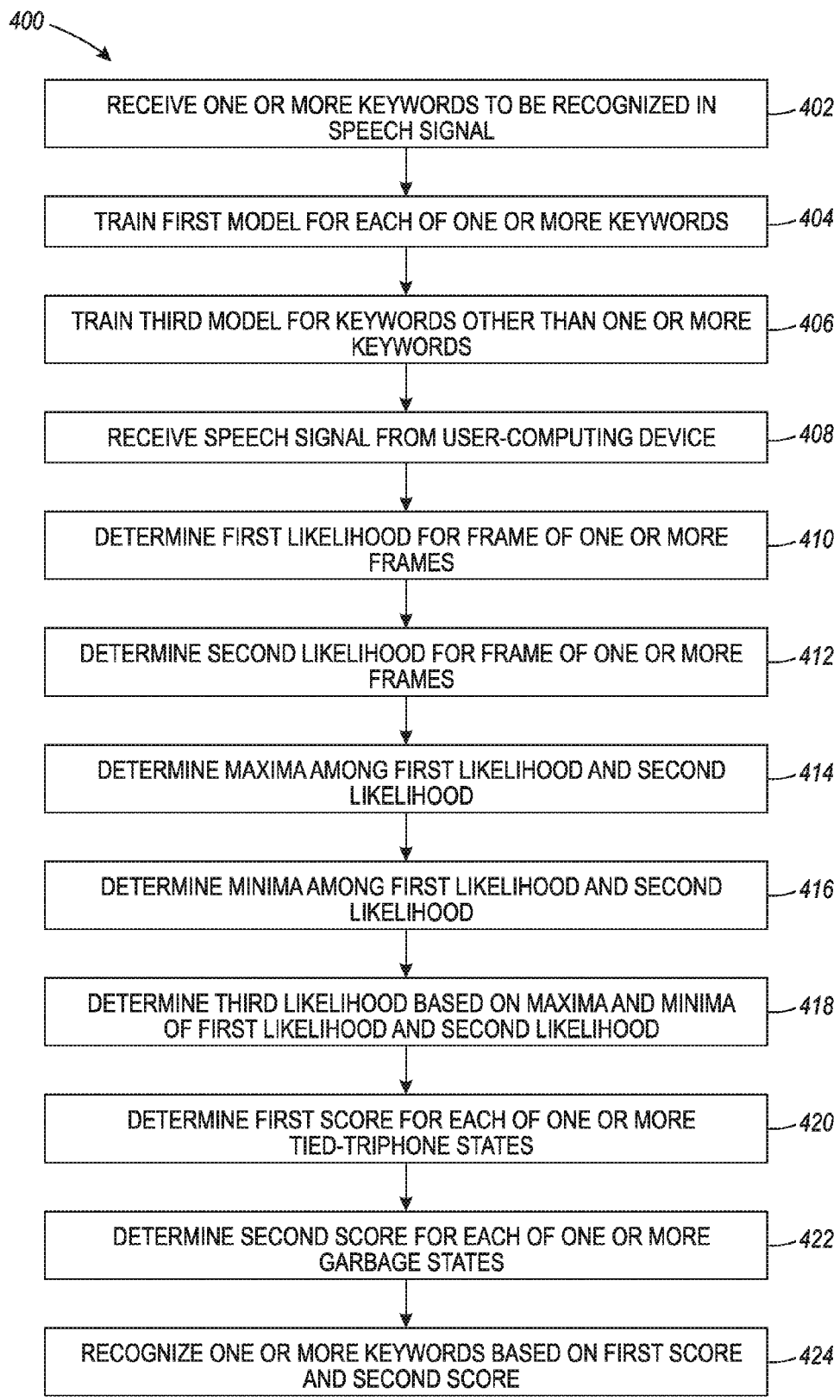
FIG. 4 is a flowchart illustrating a method for recognizing keywords in a speech signal, in accordance with at least one embodiment.

FIG. 4 is a flowchart 400 illustrating a method for recognizing the one or more keywords in the speech signal, in accordance with at least one embodiment. The flowchart 400 is described in conjunction with FIG. 2 and FIG. 3.

At step 402, the one or more keywords to be recognized in the speech signal are received. In an embodiment, the processor 202 is configured to receive the one or more keywords. In an embodiment, the processor 202 may further receive the pronunciation dictionary associated with the one or more keywords.

At step 404, the first model is trained for each of the one or more keywords. In an embodiment, the processor 202 may be configured to train the first model for each of the one or more keywords. As discussed, the first model corresponds to a HMM-GMM model. In an embodiment, the processor 202 may determine the one or more monophone states of each of the one or more keywords. In an embodiment, based on the one or more monophone states, the processor 202 may be configured to determine the one or more tied-triphone states. Thereafter, the processor 202 may train the first model for each of the one or more keywords. In an embodiment, as discussed, the first model comprises the one or more tied-triphone states. Further, the processor 202 may train the second model for each of the one or more keywords. In an embodiment, the second model comprises the one or more monophone states.

At step 406, the third model is trained for keywords other than the one or more keywords. In an embodiment, the processor 202 may be configured to train the third model for the keywords other than the one or more keywords.

At step 408, the speech signal is received. In an embodiment, the processor 202 may receive the speech signal from the agent-computing device 102 or the user-computing device 104. As discussed, the speech signal corresponds to the conversation between the agent and the user. In an embodiment, the speech signal is sampled by the speech processing unit 208 to generate the one or more frames.

At step 410, for the frame of the one or more frames, the first likelihood is determined. In an embodiment, the keyword recognizer unit 210 may be configured to determine the first likelihood. In an embodiment, the first likelihood corresponds to a probability that the frame corresponds to the one or more tied-triphone states in the first model.

At step 412, for the frame of the one or more frames, the second likelihood is determined. In an embodiment, the keywords recognition unit 210 may be configured to determine the second likelihood. In an embodiment, the second likelihood corresponds to a probability that the frame corresponds to the one or more monophone states in the second model.

At step 414, a maxima among the first likelihood and the second likelihood is determined. In an embodiment, the keywords recognition unit 210 may be configured to determine the maxima.

At step 416, a minima among the first likelihood and the second likelihood is determined. In an embodiment, the keywords recognition unit 210 may be configured to determine the minima.

At step 418, the third likelihood is determined based on the maxima and minima among the first likelihood and the second likelihood. In an embodiment, the keywords recognition unit 210 may be configured to determine the third likelihood. In an embodiment, the third likelihood corresponds to a probability that the frame corresponds to the one or more garbage states in the third model.

At step 420, the first score is determined for each of the one or more tied-triphone states. In an embodiment, the keywords recognition unit 210 determines the first score based on the first score assigned to the one or more tied-triphone states for the previous frame, and the first likelihood.

At step 422, the second score is determined for each of the one or more garbage states. In an embodiment, the keywords recognition unit 210 determines the second score based on the second score assigned to the one or more garbage states for the previous frame, and the third likelihood.

At step 424, the one or more keywords are recognized in the speech signal based on the first score and the second score. In an embodiment, the keywords recognition unit 210 may be configured to recognize the one or more keywords.

The disclosed embodiment, encompass numerous advantages. As discussed, the disclosed embodiments disclose maintaining the first models for the one or more keywords that are to be searched in the speech signal. Further, the third model disclosed in the embodiments of the disclosure enable the detection of keywords other than the one or more keywords. As the probability of the keywords that are to be recognized in the speech signal is determined, thus there is no need to determine the probability of the other keywords that may not be of relevance to the administrator. Therefore, the overall process of recognizing the one or more keywords in the speech signal is less computationally expensive in comparison to the conventional techniques. As the disclosed techniques are less computationally expensive, therefore, the disclosed techniques enable near real time detection of the keywords in the ongoing conversation or speech signal.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be RAM or ROM. The computer system further comprises a storage device, which may be a hard-disk drive or a removable storage drive such as a floppy-disk drive, an optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks such as LAN, MAN, WAN, and the Internet. The computer system facilitates input from a user through input devices accessible to the system through an I/O interface.

To process input data, the computer system executes a set of instructions that is stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The systems and methods described can also be implemented using only software programming or using only hardware or by a combination of the two techniques. The disclosure is independent of the programming language and the operating system used in computers. The instructions for the disclosure can be written in all programming languages including, but not limited to, "C," "C++," "Visual C++," "Java," and "Visual Basic." Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or to a request made by another processing machine. The disclosure can also be implemented in various operating systems and platforms including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for identifying keywords in speech signal have been disclosed. However, it should be apparent to those skilled in the art that modifications, in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skill in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method of keyword recognition in a speech signal, the method comprising:
    sampling, by one or more processors, the speech signal in one or more frames;
    determining, by the one or more processors, a first likelihood score of one or more features of a frame, of the one or more frames, of the speech signal being associated with one or more states in a first model, wherein the one or more states in the first model correspond to one or more tied triphone states of a keyword to be recognized in the speech signal, and wherein the one or more features comprise a frequency of an audio in the frame;
    determining, by the one or more processors, a second likelihood score of the one or more features of the frame of the speech signal being associated with one or more states in a second model, wherein the one or more states in the second model correspond to one or more monophone states of the keyword to be recognized in the speech signal;
    determining, by the one or more processors, a third likelihood score based on the first likelihood score and the second likelihood score, wherein the third likelihood score is deterministic of a likelihood of the frame corresponding to keywords other than the keyword; and
    determining, by the one or more processors, a presence of the keyword in the speech signal based on the first likelihood score and the third likelihood score.

2. The method of claim 1, further comprising training, by the one or more processors, the first model based on a Gaussian mixture model (GMM) for each of the one or more tied triphone states, wherein the one or more tied triphone states are based on one or more triphone states of the keyword.

3. The method of claim 1, further comprising determining, by the one or more processors, a maxima between the first likelihood score and the second likelihood score.

4. The method of claim 3, further comprising determining, by the one or more processors, a minima between the first likelihood score and the second likelihood score, wherein the determination of the third likelihood score is based on the maxima, the minima, and a value.

5. The method of claim 1, further comprising determining, by the one or more processors, a first score for each of the one or more states in the first model based on the first score of the one or more states in the first model for a previous frame, of the one or more frames, of the speech signal and the first likelihood score, wherein the keyword is recognized in the speech signal based on the first score.

6. The method of claim 1, wherein the determination of the third likelihood score is based on a third model, wherein the third model comprises a garbage state.

7. The method of claim 6, further comprising determining, by the one or more processors, a second score based on the third likelihood score.

8. A system of keyword recognition in a speech signal, the system comprising:
one or more processors configured to:
sample the speech signal in one or more frames;
determine a first likelihood score of one or more features of a frame, of the one or more frames, of the speech signal being associated with one or more states in a first model, wherein the one or more states in the first model correspond to one or more tied triphone states of a keyword to be recognized in the speech signal, and wherein the one or more features comprise a frequency of an audio in the frame;
determine a second likelihood score of the one or more features of the frame of the speech signal being associated with one or more states in a second model, wherein the one or more states in the second model correspond to one or more monophone states of the keyword to be recognized in the speech signal;
determine a third likelihood score based on the first likelihood score and the second likelihood score, wherein the third likelihood score is deterministic of a likelihood of the frame corresponding to keywords other than the keyword; and
determine a presence of the keyword in the speech signal based on the first likelihood score and the third likelihood score.

9. The system of claim 8, wherein the one or more processors are further configured to train the first model based on a Gaussian mixture model (GMM) for each of the one or more tied triphone states, wherein the one or more tied triphone states are based on one or more triphone states of the keyword.

10. The system of claim 8, wherein the one or more processors are further configured to determine a maxima between the first likelihood score and the second likelihood score.

11. The system of claim 10, wherein the one or more processors are further configured to determine a minima between the first likelihood score and the second likelihood score, wherein the determination of the third likelihood score is based on the maxima, the minima, and a value.

12. The system of claim 8, wherein the one or more processors are further configured to determine a first score for each of the one or more states in the first model based on the first score of the one or more states in the first model for a previous frame, of the one or more frames, of the speech signal and the first likelihood score, wherein the keyword is recognized in the speech signal based on the first score.

13. The system of claim 8, wherein the determination of the third likelihood score is based on a third model, wherein the third model comprises a garbage state.

14. The system of claim 13, wherein the one or more processors are further configured to determine a second score based on the third likelihood score.

15. A computer program product for use with a computer, the computer program product comprising a non-transitory computer readable medium, wherein the non-transitory computer readable medium stores a computer program code for keyword recognition in a speech signal, wherein the computer program code is executable by one or more processors to:
sample the speech signal in one or more frames;
determine a first likelihood score of one or more features of a frame, of the one or more frames, of the speech signal being associated with one or more states in a first model, wherein the one or more states in the first model correspond to one or more tied triphone states of a keyword to be recognized in the speech signal, and wherein the one or more features comprise a frequency of an audio in the frame;
determine a second likelihood score of the one or more features of the frame of the speech signal being associated with one or more states in a second model, wherein the one or more states in the second model correspond to one or more monophone states of the keyword to be recognized in the speech signal;
determine a third likelihood score based on the first likelihood score and the second likelihood score, wherein the third likelihood score is deterministic of a likelihood of the frame corresponding to keywords other than the keyword; and
determine a presence of the keyword in the speech signal based on the first likelihood score and the third likelihood score.

* * * * *